F. LEACH.
WHEEL FENDER.
APPLICATION FILED JAN. 25, 1915.
1,137,872.
Patented May 4, 1915.
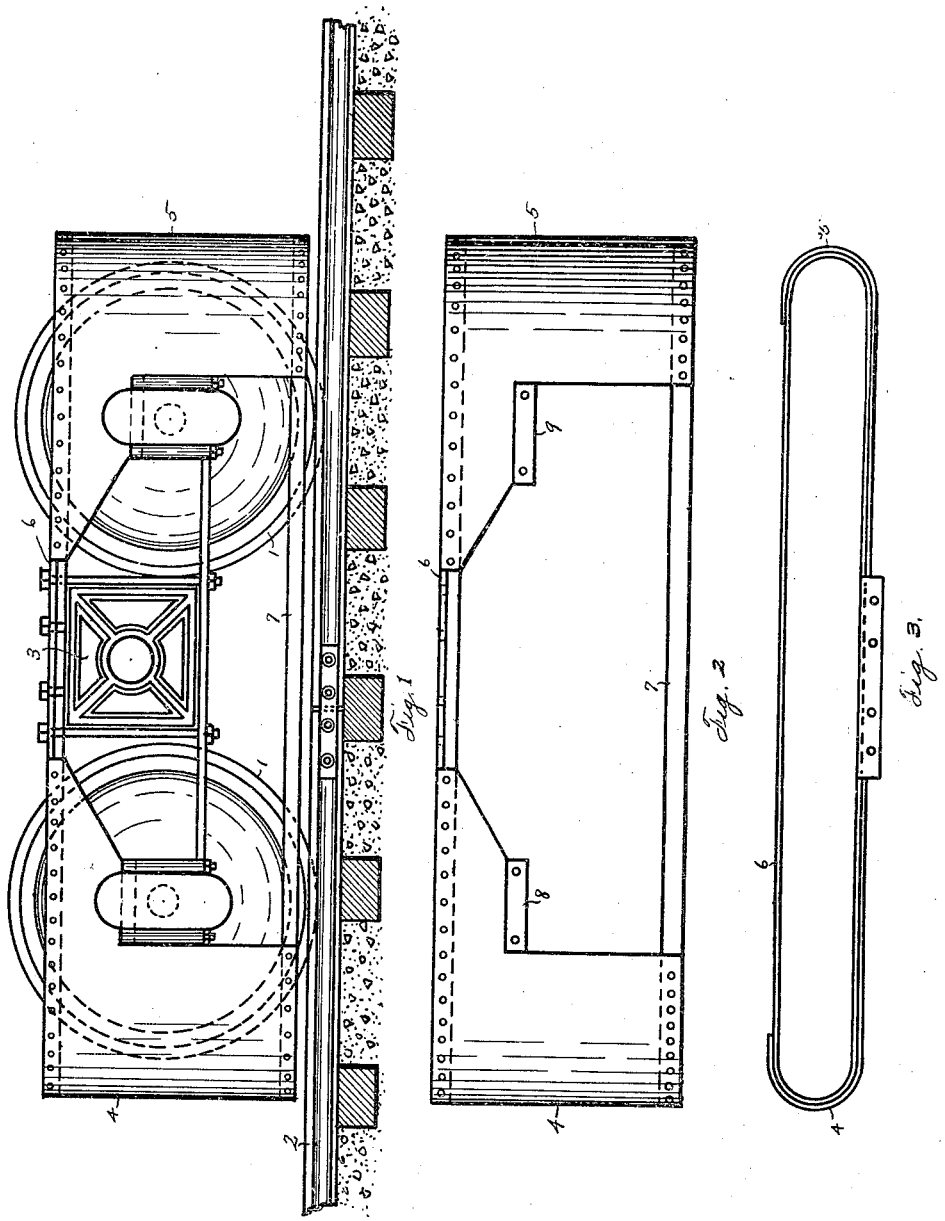
WITNESSES:
INVENTOR
Felix Leach
BY
ATTORNEYS.

UNITED STATES PATENT OFFICE.

FELIX LEACH, OF ALLENFARM, TEXAS.

WHEEL-FENDER.

1,137,872.  Specification of Letters Patent.  Patented May 4, 1915.

Application filed January 25, 1915. Serial No. 4,162.

*To all whom it may concern:*

Be it known that I, FELIX LEACH, a citizen of the United States, residing at Allenfarm, in the county of Brazos and State of Texas, have invented certain new and useful Improvements in Wheel-Fenders, of which the following is a specification.

This invention relates to new and useful improvements in a wheel fender, and is designed particularly to be used on the wheels forming the trucks of railway cars, street cars, engines and such other vehicles as travel on rails.

The object of the invention is to provide a device of the character described that will partially inclose, and act as a fender for truck wheels, for the purpose of preventing the wheels from coming in direct contact with any object or body that might be on the track along which the wheel passes, and in front of the wheel, so as to prevent the derailment of the wheel and injury to said body.

With the above and other objects in view, the invention has particular relation to certain novel features of construction and use, an example of which is given in this specification and illustrated in the accompanying drawings, wherein:

Figure 1 is a side elevation of the truck with the fender applied thereto. Fig. 2 is a side elevation of the fender, and Fig. 3, is a plan view thereof.

Referring now more particularly to the drawings wherein like numerals of reference designate similar parts in each of the figures: the numerals 1, 1 refer to the truck wheels which move on the rail 2 and which rotate on the axle ends in the well known manner.

The numeral 3, designates the transverse beam supporting the car end and to which the fender is secured, as shown in Fig. 1. The fender is composed of two hoods, 4 and 5, formed of sheet metal, which fit over and inclose the wheels and which extend down to within a short distance, approximately an inch, from the rail. These hoods are open above and below, so as not to come in contact with the wheel rim, and are fixed in position relative to each other, and also reinforced by means of the metallic bands 6 and 7, approximately elliptical in shape, and which surround the truck wheels horizontally and to which the upper and lower ends of the hoods are secured by means of suitable bolts, as shown. The band 6, is secured to the corresponding end of the supporting beam 3, by means of bolts, or in any other desirable manner, as is shown in Fig. 1, and the outer side of each hood has an abruptly offset transverse shoulder, said shoulders being indicated by the numerals 8 and 9, and resting upon the boxings of the wheels so as to form an additional support for the fender.

It is obvious from the description hereinbefore given and from the drawings that in whichever way the truck may move, the front wheel will be protected by its hood, in advance of the wheel and moving closely along the rail, so as to force any object off of the rail before the wheel comes in contact with it, thus accomplishing the objects hereinbefore set forth.

While I have shown only one form of this device, it is obvious that the mechanical structure thereof may be modified without departing from the principle of the invention and I hereby reserve the right to make such mechanical improvements and modifications, so long as I keep within the scope of the appended claims.

What I claim is:

1. A fender for truck wheels consisting of a hood for each wheel of the truck, said hoods fitting over the wheels to be protected thereby and reinforcing bands secured to the upper and lower edges respectively, of the hoods and fixing said hoods in their relation to each other.

2. A fender for truck wheels consisting of a plurality of hoods formed of sheet metal, each hood fitting over and protecting its corresponding wheel, and approximately elliptical bands secured to the upper and lower edges respectively, of the hoods.

3. A fender for truck wheels consisting of a plurality of hoods approximately semi-elliptical in form, in transverse section, and bands approximately elliptical in form to which the upper and lower edges of said hoods are secured for fixing the hoods in their relation to each other.

In testimony whereof I have signed my name to this specification in the presence of two subscribing witnesses.

FELIX LEACH.

Witnesses:
C. L. GOODMAN,
R. SMITH.

Copies of this patent may be obtained for five cents each, by addressing the "Commissioner of Patents, Washington, D. C."